US009923720B2

United States Patent
Garcia Morchon et al.

(10) Patent No.: US 9,923,720 B2
(45) Date of Patent: Mar. 20, 2018

(54) NETWORK DEVICE CONFIGURED TO DERIVE A SHARED KEY

(71) Applicant: KONINKLIJKE PHILIPS N.V., Eindhoven (NL)

(72) Inventors: Oscar Garcia Morchon, Aachen (DE); Sandeep Shankaran Kumar, Waalre (NL); Ludovicus Marinus Gerardus Maria Tolhuizen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/769,137

(22) PCT Filed: Feb. 11, 2014

(86) PCT No.: PCT/IB2014/058891
§ 371 (c)(1),
(2) Date: Aug. 20, 2015

(87) PCT Pub. No.: WO2014/132155
PCT Pub. Date: Sep. 4, 2014

(65) Prior Publication Data
US 2015/0381365 A1    Dec. 31, 2015

Related U.S. Application Data

(60) Provisional application No. 61/770,503, filed on Feb. 28, 2013.

(51) Int. Cl.
*H04L 9/28* (2006.01)
*H04L 9/30* (2006.01)
*H04L 9/08* (2006.01)

(52) U.S. Cl.
CPC .......... *H04L 9/3093* (2013.01); *H04L 9/0816* (2013.01); *H04L 9/0838* (2013.01); *H04L 9/0847* (2013.01); *H04L 2209/24* (2013.01)

(58) Field of Classification Search
CPC ... H04L 9/3093; H04L 9/0816; H04L 9/0838; H04L 9/0847; H04L 2209/24
See application file for complete search history.

(56) References Cited

U.S. PATENT DOCUMENTS

| | | | |
|---|---|---|---|
| 8,189,791 B2 * | 5/2012 | Garcia | H04L 9/083 380/279 |
| 8,515,058 B1 * | 8/2013 | Gentry | H04L 9/008 380/28 |

(Continued)

FOREIGN PATENT DOCUMENTS

| | | |
|---|---|---|
| EP | 2667539 A1 | 11/2013 |
| WO | WO2007149850 A2 | 12/2007 |

(Continued)

OTHER PUBLICATIONS

S0N6 GU0 et al., "A Permutation-Based Multi-Polynomial Scheme for Pairwise Key Establishment in Sensor Networks", Communications (ICC), 2010 IEEE International Conference ON, IEEE, Piscataway, NJ, USA, May 23, 2010 (May 23, 2010), pp. 1-5, XP031703040.

(Continued)

*Primary Examiner* — Sharon Lynch
(74) *Attorney, Agent, or Firm* — Larry Liberchuk

(57) ABSTRACT

A network device (110) is provided which is configured to determine a shared cryptographic key of key length (b) bits shared with a second network device (120) from a polynomial and an identity number of the second network device. A reduction algorithm is used to evaluate the polynomial in the identity number of the second network device and reduce module a public modulus and modulo a key modulus. The reduction algorithm comprises an iteration over the terms of the polynomial. In at least the iteration which iteration is associated with a particular term of the polynomial are comprised a first and second multiplication. The first mul- (Continued)

tiplication is between the identity number and a least significant part of the coefficient of the particular term obtained from the representation of the polynomial, the least significant part of the coefficient being formed by the key length least significant bits of the coefficient of the particular term. The second multiplication is between a second multiplication between the identity number and a further part of the coefficient of the particular term obtained from the representation of the polynomial, the further part of the coefficient being formed by bits of the coefficient of the particular term different from the key length least significant bits, the further part and the least significant part together forming strictly fewer bits than in the coefficient of the particular term of the polynomial.

12 Claims, 6 Drawing Sheets

(56) References Cited

U.S. PATENT DOCUMENTS

| | | | | |
|---|---|---|---|---|
| 8,861,716 B2* | 10/2014 | Halevi | ............... | H04L 9/008 380/28 |
| 8,903,083 B2* | 12/2014 | Gentry | ............... | H04L 9/008 380/28 |
| 8,958,555 B2* | 2/2015 | Gentry | ............... | H04L 9/008 380/277 |
| 9,686,075 B2* | 6/2017 | Gomez | ............... | H04L 9/3093 |
| 9,722,787 B2* | 8/2017 | Garcia Morchon | .. | H04L 9/0866 |
| 2007/0080341 A1* | 4/2007 | Macready | ............. | B82Y 10/00 257/31 |
| 2008/0240423 A1* | 10/2008 | Gueron | ............... | G06F 7/724 380/28 |
| 2009/0129599 A1* | 5/2009 | Garcia | ............... | H04L 9/083 380/279 |
| 2009/0310775 A1* | 12/2009 | Gueron | ............... | H04L 9/0637 380/28 |
| 2010/0020965 A1* | 1/2010 | Gueron | ............... | G06F 7/724 380/44 |
| 2011/0206201 A1* | 8/2011 | Garcia Morchon | .. | H04L 9/0838 380/44 |
| 2011/0317838 A1 | 12/2011 | Garcia Morchon | | |
| 2012/0039463 A1 | 2/2012 | Gentry | | |
| 2012/0039465 A1 | 2/2012 | Gentry | | |
| 2015/0341172 A1* | 11/2015 | Gomez | ............... | H04L 9/0838 380/285 |
| 2016/0156470 A1* | 6/2016 | Rietman | ............... | H04L 9/0838 380/44 |
| 2016/0254909 A1* | 9/2016 | Garcia Morchon | .. | H04L 9/0838 380/46 |

FOREIGN PATENT DOCUMENTS

| | | |
|---|---|---|
| WO | WO2012098157 A2 | 7/2012 |
| WO | WO2014096420 A1 | 6/2014 |

OTHER PUBLICATIONS

Blund0 et al., "Perfectly-Secure Key Distribution for Dynamic Conferences", Lecture Notes in Computer Science/Computational Science (Eurocrypt) CHES 2008, Springer, DE, vol. 740, Jun. 6, 1995 (Jun. 6, 1995), pp. 1-26, XP002352508.

"DRM Specification—Open Mobile Alliance", OMA-TS-DRM-DRM-V2_0_2-20080723-A, San Diego, CA, Jul. 23, 2008 (Jul. 23, 2008), pp. 1-152, XP064078859.

Gianluca Forte et al., "Systolic Architectures to Evaluate Polynomials of Degree n Using the Homer's Rule", Circuits and Systems (LASCAS), 2013 IEEE Fourth Latin American Symposium on, IEEE, Feb. 27, 2013 (Feb. 27, 2013), pp. 1-4, XP032409880.

Arnold Schonhage, "Factorization of Univariate Integer Polynomials by Diophantine Approximation and an Improved Basis Reduction Algorithm", Jul. 16, 1984 (Jul. 16, 1984), Automata, Languages and Programming, Springer Berlin Heidelberg, Berlin, Heidelberg, pp. 436-447, XP019176943.

* cited by examiner

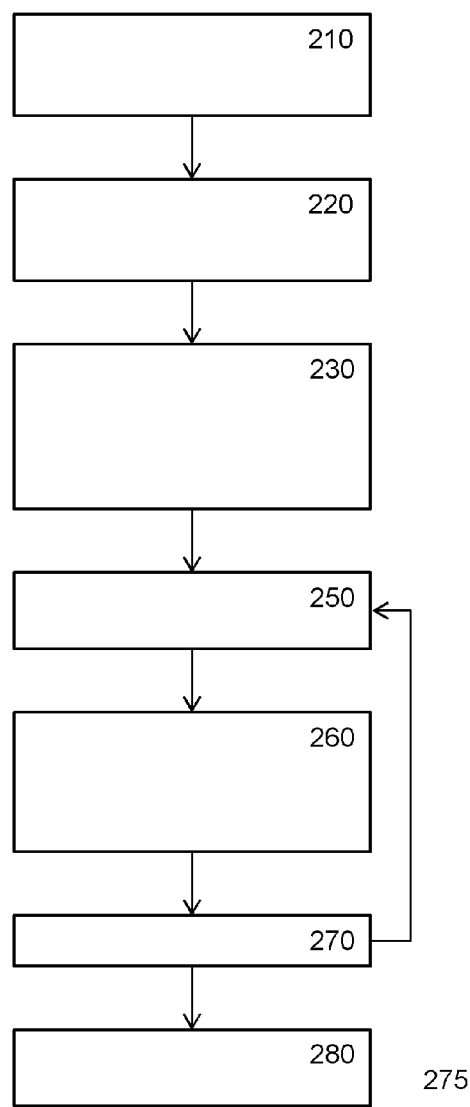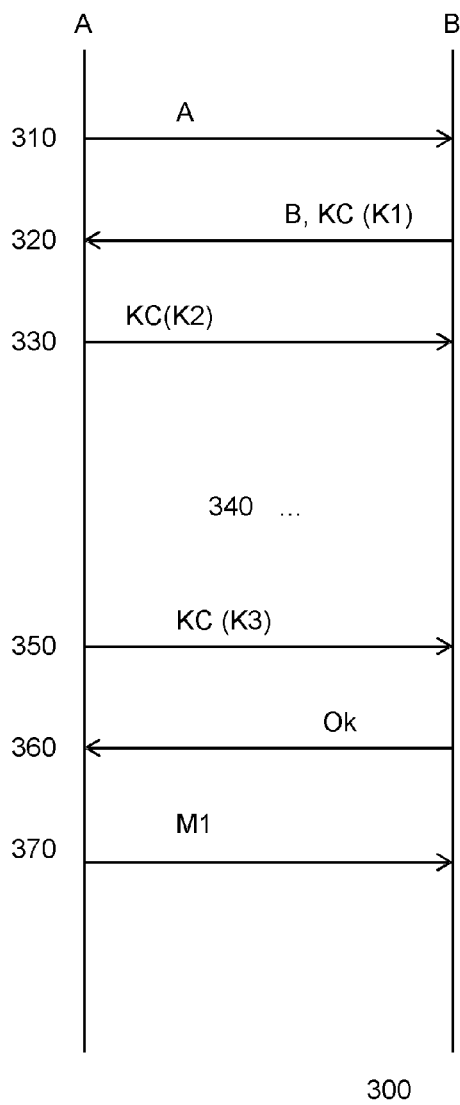
Figure 2
Figure 3

Input: $b, \alpha, \eta', KM_{\eta,j}$ where $j \in \{0, \ldots, \alpha\}$
Output: $\langle(\sum_{j=0}^{\alpha} KM_{\eta,j}\eta'^j)_N\rangle_{2^b}$
1: $N \Leftarrow 2^{(\alpha+2)b} - 1$
2: $key \Leftarrow 0$
3: for $j = \alpha$ to $0$ do
4:     $key \Leftarrow \langle key \times \eta' + KM_{\eta,j}\rangle_N$
5: end for
6: return $\langle key\rangle_{2^b}$

Figure 4a

Input: $b, \alpha, \eta', KM_{\eta,j}$ where $j \in \{0, \ldots, \alpha\}$
Output: $\langle(\sum_{j=0}^{\alpha} KM_{\eta,j}\eta'^j)_N\rangle_{2^b}$
1: $key \Leftarrow 0$
2: for $j = \alpha$ to $0$ do
3:     $temp \Leftarrow key \times \eta'$
4:     $R_0 \Leftarrow \langle temp\rangle_{2^{(\alpha+2)b}}$
5:     $R_1 \Leftarrow temp \gg (\alpha+2)b$
6:     $key \Leftarrow R_0 + R_1 + KM_{\eta,j}$
7: end for
8: return $\langle key\rangle_{2^b}$

Figure 4b

Input: $b, \alpha, \eta', KM_{\eta,j}$ where $j \in \{0, \ldots, \alpha\}$
Output: $\langle (\sum_{j=0}^{\alpha} KM_{\eta,j} \eta'^j)_N \rangle_{2^b}$
1: $key \Leftarrow KM_{\eta,\alpha}$
2: for $j = \alpha - 1$ to $1$ do
3:     $temp \Leftarrow key \times \eta' + KM_{\eta,j}$
4:     $R_0 \Leftarrow \langle temp \rangle_{2^{(\alpha+2)b}}$
5:     $R_1 \Leftarrow \langle temp \gg (\alpha + 2)b \rangle_{2^b}$
6:     $key \Leftarrow (R_0 + R_1)$
7: end for
8: $R_0 \Leftarrow \langle key \rangle_{2^b} \times \eta'$
9: $R_1 \Leftarrow \langle key \gg (\alpha + 1)b \rangle_{2^b} \times \eta'$
10: return $\langle R_0 \rangle_{2^b} + \langle R_1 \gg b \rangle_{2^b} + \langle KM_{\eta,0} \rangle_{2^b}$

Figure 4c

Input: $b, \alpha, \eta', KM_{\eta,j}$ where $j \in \{0, \ldots, \alpha\}$
Output: $\langle (\sum_{j=0}^{\alpha} KM_{\eta,j} \eta'^j)_N \rangle_{2^b}$
1: $key \Leftarrow KM_{\eta,\alpha}$
2: $red \Leftarrow 1$
3: for $j = \alpha - 1$ to $1$ do
4:     $temp_{high} \Leftarrow MSB_{j+red}(key) \times \eta'$
5:     $temp_{low} \Leftarrow (LSB_1(key) \times \eta')_{2^b}$
6:     $temp_{high-low} \Leftarrow \langle temp_{high} \rangle_{2^{(j+red)b}}$
7:     $temp_{high-low} \Leftarrow temp_{high-low} \ll ((alpha + 2 - j - red)b)$
8:     $temp_{high-high} \Leftarrow temp_{high} \gg ((j + red) * b)$
9:     $key \Leftarrow temp_{high-low} + temp_{high-high} + temp_{low} + KM_{\eta,j}$
10: end for
11: $R_0 \Leftarrow \langle key \rangle_{2^b} \times \eta'$
12: $R_1 \Leftarrow \langle key \gg (\alpha + 1)b \rangle_{2^b} \times \eta'$
13: return $\langle R_0 \rangle_{2^b} + \langle R_1 \gg b \rangle_{2^b} + \langle KM_{\eta,0} \rangle_{2^b}$

Figure 4d

Input: $b, \alpha, \eta', KM_{\eta,j}$ where $j \in \{0, \ldots, \alpha\}$
Output: $\langle \langle \sum_{j=0}^{\alpha} KM_{\eta,j} \eta'^j \rangle_N \rangle_{2^b}$
1: $key \Leftarrow \langle KM_{\eta,\alpha} \rangle_{2^b}$
2: $temp \Leftarrow KM_{\eta,\alpha}$
3: for $j = \alpha - 1$ to $0$ do
4: $\quad temp \Leftarrow \langle temp \gg b \rangle_{2^{(j+2)b}}$
5: $\quad temp \Leftarrow temp \times \eta' + (KM_{\eta,j} \gg (\alpha - j)b)$
6: $\quad key \Leftarrow \langle key \times \eta' \rangle_{2^b}$
7: $\quad key \Leftarrow \langle key + \langle KM_{\eta,j} \rangle_{2^b} + (temp \gg (j+2)b) \rangle_{2^b}$
8: end for
9: return $key$

Figure 4e $key = KM_\alpha$
for $j = \alpha - 1$ to $0$ do
$\quad t \Leftarrow key \times \eta'$
$\quad t \Leftarrow t + (KM_j \ll b)$
$\quad key \Leftarrow t \gg b$
end for
return $\langle key \rangle_{2^b}$

NETWORK DEVICE CONFIGURED TO DERIVE A SHARED KEY

FIELD OF THE INVENTION

The invention relates to a first network device configured to determine a shared cryptographic key of key length bits shared with a second network device from a polynomial and an identity number of the second network device, the first network device comprising, a polynomial manipulation device configured to apply the polynomial to the identity number.

BACKGROUND OF THE INVENTION

Given a communications network comprising multiple network devices, it is a problem to set up secure connections between pairs of such network devices. One way to achieve this is described in C. Blundo, A. De Santis, A. Herzberg, S. Kutten, U. Vaccaro and M. Yung, "Perfectly-Secure Key distribution for Dynamic Conferences", Springer Lecture Notes in Mathematics, Vol. 740, pp. 471-486, 1993 (referred to as 'Blundo').

It assumes a central authority, also referred to as the network authority or as the Trusted Third Party (TTP), that generates a symmetric bivariate polynomial f(x,y), with coefficients in the finite field F with p elements, wherein p is a prime number or a power of a prime number. Each device has an identity number in F and is provided with local key material by the TTP. For a device with identifier the local key material are the coefficients of the polynomial f(η,y).

If a device η wishes to communicate with device η', it uses its key material to generate the key K(η, η')=f(η, η'). As f is symmetric, the same key is generated.

In the patent application with title "KEY SHARING DEVICE AND SYSTEM FOR CONFIGURATION THEREOF" by the same applicant as the current patent application an improved method of configuring network devices for key sharing is given. The patent application has application No. 61/740,488 and filing data 2012 Dec. 21 (incorporated herein by reference) and will be referred to as the 'configuring application'.

In a collection of multiple network devices, each one has its own unique identity number and local key material. The local material has been derived from a secret polynomial; the latter is often a bivariate polynomial. In the configuring application it is explained how the secret polynomial may be chosen to obtain higher resistance against certain attacks. One such attack in particular is a collusion attack in which multiple network devices try to reconstruct the secret polynomial.

The network devices need to do some work to establish the shared key. For example, consider a pair of network devices that each received a univariate polynomial obtained for them from a secret bivariate polynomial. When two network devices need to establish a cryptographic key among them, they obtain the identity number of the other device and combine it with their local key material to obtain the shared key.

One way to derive the shared key is for each one of the network devices to substitute the identity number of the other network device into its univariate polynomial, reducing the result of the substituting modulo a public modulus and then followed by reducing modulo a key modulus. The key modulus is a power of 2, the exponent of the power being at least the key length.

Thus in a first step towards obtaining the shared key a network device may have to perform a polynomial evaluation in a particular point followed by two reductions.

SUMMARY OF THE INVENTION

It would be advantageous to have an improved network device configured to determine a shared cryptographic key that requires fewer resources, e.g. time and/or storage resources, to obtain the shared key.

A first network device is provided which is configured to determine a shared cryptographic key of key length (b) bits shared with a second network device from a polynomial and an identity number of the second network device. The polynomial having multiple terms, each term being associated with a different degree and a coefficient. The first network device comprises: an electronic storage, a receiver, a polynomial manipulation device, and a key derivation device.

The electronic storage is configured for storing local key material for the first network device, the local key material comprising a representation of the polynomial for later evaluation by the first network device.

The receiver is configured for obtaining the identity number of the second network device, the second network device being different from the first network device.

The polynomial manipulation device is configured to apply the polynomial to the identity number according to a reduction algorithm.

The key derivation device is configured for deriving the shared key from the reduction result.

The reduction algorithm comprises an iteration over the terms of the polynomial. At least one iteration comprises a first multiplication and a second multiplication. Said at least one iteration is associated with a particular term of the polynomial.

The first multiplication is between the identity number and a least significant part of the coefficient of the particular term obtained from the representation of the polynomial, the least significant part of the coefficient being formed by the key length least significant bits of the coefficient of the particular term.

The second multiplication is between the identity number and a further part of the coefficient of the particular term obtained from the representation of the polynomial, the further part of the coefficient being formed by bits of the coefficient of the particular term different from the key length least significant bits, the further part and the least significant part together forming strictly fewer bits than in the coefficient of the particular term of the polynomial.

The first and second network device may be a mobile device, say a mobile phone, a computer, etc. In a particular advantageous embodiment, the network device is a lighting device, say a lamp. The shared key may be used to communicate information about the condition of the light and/or transmit operational commands to the light, say to turn the light on or off. The communication may be encrypted with the shared key.

In addition to key establishment in, potentially large, lighting networks that require secure communications, the invention may also be applied to any type of communication network requiring secure communication between pairs of devices.

The network device may be an electronic device equipped with electronic communication and computation means. The network device may be attached, e.g. in the form of an RFID tag, to any non-electronic object. For example, this method would be suitable for the 'internet of things'. For example, objects, in particular low cost objects, may be equipped with radio tags through which they may communicate, e.g. may be identified. Such objects may be inventoried through electronic means such as a computer. Stolen or broken items would be easily tracked and located. One particularly promising application is a lamp comprising a network device configured to determine a shared key. Such a lamp may securely communicate its status; such a lamp could be securely controlled, e.g., turned on and/or off. A network device may be one of multiple network devices each comprising an electronic communicator for sending and receiving an identity number and for sending an electronic status message, and each comprising an integrated circuit configured for deriving a shared key following a method according to the invention.

In an embodiment, the method in the invention can be used as a cryptographic method for security protocols such us IPSec, (D)TLS, HIP, or ZigBee. In particular, a device using one of those protocols is associated to an identifier. A second device willing to communicate with the first device can generate a common pair wise key with the first device given its identifier, and the pair wise key (or a key derived from this by means of, e.g., a key derivation function) can be used in a method of the above protocols based on pre-shared key. In particular, the identifier of a device as defined in this invention can be a network address such as the ZigBee short address, an IP address, or the host identifier. The identifier can also be the IEEE address of a device or a proprietary bit string associated to the device so that a device receives some local keying material associated to the IEEE address during manufacturing.

Deriving a shared key may be used for many applications. Typically, the shared key will be a cryptographic symmetric key. The symmetric key may be used for confidentiality, e.g., outgoing or incoming messages may be encrypted with the symmetric key. Only a device with access to both identity numbers and one of the two local key materials (or access to the root key material) will be able to decrypt the communications. The symmetric key may be used for authentication, e.g., outgoing or incoming messages may be authenticated with the symmetric key. In this way the origin of the message may be validated. Only a device with access to both identity numbers and one of the two local key materials (or access to the root key material) will be able to create authenticated messages.

The network device may be configured for key sharing by a network authority, e.g., a trusted third party. The network authority may obtain the needed material, e.g., root key material from another source, but may also generate this himself. For example, the public modulus may be generated. If the network authority uses one of the methods described in the configuring application, it may generate a private modulus, even if the public modulus is a system parameter and received.

In an embodiment, the public modulus N is chosen such that it satisfies $2^{(a+2)b}-1 \leq N \leq 2^{(a+2)b}-1$, wherein, a (or α) represents the degree of the polynomial corresponding to the local key material and b represents the key length. For example, in an embodiment $N=2^{(a+2)b}-1$. The modulo operation for the latter choice may be implemented particularly efficiently. Having a fixed public modulus has the advantage that it need not be communicated to the network devices, but may be integrated with e.g. their system software.

The key length (b) bits may be chosen in dependence upon security requirements and available resources. For normal security 128 bit may sufficient, for high security 256 is possible or even higher, for low security 80 or even 64 is possible. The identity numbers of the network device are smaller than 2 to the power of the key length.

For each network device, the polynomial corresponding to the local key material was generated by a network authority. Typically the polynomial is univariate and derived from a bivariate root polynomial. If the root polynomial is multi-variate with say k variables. Then the network devices needs to receive k−1 different identity numbers to derive a key shared among k devices. The received k−1 different identity numbers substituted in the variables of the polynomial represented in the network device. The situation k=2 corresponds to key sharing among two devices.

Interestingly, the representation of the polynomial in the network device for evaluation of the polynomial may be lossy, i.e., the polynomial cannot be reconstructed from the representation because too little information is represented. For example, for at least one coefficient of the polynomial, a group of bits, say the 'middle words', i.e., not a most and not a least significant word, may be left out, i.e., not stored in the representation. For example, for the constant term of the polynomial only the least significant words need be recorded. Words are key length bits long. For example, the network authority may perform the following steps after generating the local polynomial: selecting for each coefficient a further part, say a most significant part, for use in a second multiplication and a least significant part for use in a first multiplication. For at least one coefficient the further part and least significant parts have strictly fewer bits than the coefficient of the corresponding term. For each coefficient the further part and least significant part are stored in the local key material. Preferably, the middle part of a coefficient, i.e., between a most and a least significant part is not stored in the local key material. The local key material is stored at the network device.

The identity number of the second network device may be received in electronic and digital form, say as a binary bit string. The identity number of the second network device is different from the identity number of the first network device.

The polynomial manipulation device is configured to apply the polynomial to the identity number according to a reduction algorithm. The reduction algorithm is configured so that is procures a reduction result that corresponds to the result of substituting the identity number of the second network device into the polynomial, and reducing the result of the substituting modulo a public modulus followed by reducing modulo a key modulus, the key modulus being a power of 2, the exponent of the power being at least the key length.

In embodiment, the public modulus equals 2 to an exponent ($2^{(a+2)b}$) plus an offset, wherein the exponent is a multiple of the key length, and wherein the absolute value of the offset is less than 2 to the power of the key length, each coefficient of the polynomial being less than the public modulus. Particularly advantageous is minus an offset of 1. In this case the modular N operation reduces to an addition (as explained below).

Interestingly, in an embodiment each iteration has a first and second multiplication. The first multiplication is between the received identity number and the least significant b bit word of the coefficient of that term, i.e., the size of the first multiplication is constant. The second multiplication is between the received identity number and a further part of the coefficient. The size of the further part increases with the degree of the term; preferably it increases monotonically; more preferably it increases strictly. For example, the size may be a number of words equal to the degree plus an error control term. Thus the size of the second multiplication decreases with the degree. By having the size of the further part increases strictly with the degree, it only large where the influence of the reduction result is large, and small where the influence is small, as a result a large reduction in computational resources is achieved.

The inventors had the insight that it is in particular the most and least significant parts of coefficients that contribute to the end result, i.e., the reduction result. In the coefficient these two parts are separated by middle words which are not needed, since they do not or only rarely influence the reduction result. In an embodiment, the least significant part and the further part, i.e., most significant part are brought together. For example, in at least one of the coefficients of the polynomial are represented in pre-processed form, in the pre-processed form the least significant part and the further part of a coefficient of a particular term are represented in a single bit string adjacent to each other, the reduction algorithm comprising a single multiplication between the identity number and the single bit string for executing the first and second multiplication together.

The coefficient may be obtained efficiently in pre-processed form by multiplying by 2 to the power of a multiple of the key length followed by reduction modulo the public modulus.

Any pair of two network devices out of multiple network devices that each have an identity number and local key material generated for the identity number are able to negotiate a shared key with few resources. The two network devices need only exchange their identity numbers, which need not be kept secret, and perform polynomial computations. The type of computations needed do not require large computational resources, which means that this method is suitable for low-cost high volume type of applications.

If the local key material has been obtained from a symmetric polynomial, this allows both network devices in a pair of network devices to obtain the same shared key. If an obfuscating number has been added to the local key material, the relation between the local key material and the root key material has been disturbed.

In an embodiment the symmetric bivariate polynomial is generated by the network authority. For example, the symmetric bivariate polynomial may be a random symmetric bivariate polynomial. For example, the coefficients may be selected as random numbers using a random number generator.

In an embodiment, a number of the least significant bits of the shared key are removed; for example, the number of removed bits may be 1, 2 or more, 4 or more, 8 or more, 16 or more, 32 or more, 64 or more. By removing more of the least significant bits, the chance of having keys that are not equal is reduced; in particular it may be reduced to any desired threshold. The chance of shared keys being equal may be computed, by following the mathematical relationships, it may also be determined by experiment.

A polynomial manipulation device may be implemented in software running on a computer, say on an integrated circuit. A polynomial manipulation device may be very efficiently implemented in hardware. A combination is also possible. For example, a polynomial manipulation device may be implemented by manipulating arrays of coefficients representing the polynomials.

Electronically storing the generated local key material at the network device may be implemented by electronically sending the generated local key material to the network device, e.g., using a wired connection, or using a wireless connection and having the generated local key material stored at the network device. This may be done during manufacturing or installation, e.g., during testing, of an integrated circuit in the network device. The test equipment may comprise or be connected the network authority. This may also happen after a successful joining of a device to an operation network (i.e., after network access or bootstrapping). In particular, the local key material can be distributed as a part of operational network parameters.

Obtaining local key material for the first network device in electronic form may be done by electronically receiving the local key material from a system for configuring a network device for key sharing, e.g., a network authority device. Obtaining local key material may also be done by retrieving the local key material from a local storage, e.g., a memory such as flash memory.

Obtaining an identity number for a second network device, may be done by receiving the identity number from the second network device, e.g., directly from second network device, e.g., wirelessly receiving from the second network device.

The public modulus and the key modulus may be stored in a network device. They may also be received from a network authority. They may also be implicit in software of the network device. For example, in an embodiment the key modulus is a power of two. Reduction modulo such a key modulus may be done by discarding all bits except the key length least significant bits. First the result of the substituting is reduced modulo the public modulus which is then further reduced modulo the key modulus.

Although not required, the public modulus and key modulus may be relatively prime. This may be achieved by having the public modulus odd and the key modulus a power of 2. In any case, it is avoided that the key modulus divides the public modulus, as then reduction modulo the public modulus could be omitted.

In an embodiment, a first network device receives multiple (n) local key materials associated to the device's identifier. The key generated between this first device and a second device is obtained as the combination (e.g., concatenation) of the multiple (n) keys obtained by evaluating each of the multiple (n) local key materials of the first device in the identifier of the second device. This allows use of the method in parallel.

The use of asymmetric bivariate polynomials as root keying material, i.e., $f(x,y) != f(y,x)$, allows to accommodate the creation of two groups of devices such as devices in the first group receive KM(Id,y) and devices in the second group receive KM(x,iD) being KM the local key material stored on a device. Two devices belonging to the same group cannot generate a common key, but two devices in different groups can. See further Blundo.

The identity number of a network device may be computed as the one-way function of a bit string containing information associated to the device. The one-way function can be a cryptographic hash function such as SHA2 or SHA3. The output of the one-way function can be truncated so that it fits the identifier size. Alternatively the size of the one-way function is smaller than the maximum identifier size.

An aspect of the invention concerns a key sharing system comprising a system for configuring a network device for key sharing and at least two first network devices. The system for configuring a network device derives a local polynomial, say a univariate polynomial, from a multivariate root polynomial, say a bivariate polynomial. From the local polynomial the representation of the polynomial is derived. In a simple embodiment the representation of the polynomial is a digital list of the coefficients of the polynomial, say sorted by degree of the term. But in an advanced embodiment, parts of coefficients are left out in the representation.

In an embodiment the system for configuring a network device for key comprises a key material obtainer for obtaining in electronic form, a public modulus, and a symmetric multivariate polynomial having integer coefficients, a generator for generating local key material for a network device of the at least two first network devices, comprising a network device manager for obtaining in electronic form an identity number for the network device and for electronically storing the generated local key material at the network device, a polynomial manipulation device for determining a polynomial from the bivariate polynomial by substituting the identity number into the multivariate polynomial.

The system for configuring a network device may also do the preprocessing, for example, in an embodiment, the generator of the system for configuring a network device is configured to obtain one or more coefficients in pre-processed form by multiplying a coefficient of the determined polynomial by 2 to the power of a multiple of the key length followed by reduction modulo the public modulus.

This preprocessing could also be done by the network device, say, by the polynomial manipulation device.

In an embodiment of the system for configuring a network device comprises
  a key material obtainer for obtaining in electronic form a private modulus, a public modulus, and a symmetric bivariate polynomial having integer coefficients, the binary representation of the public modulus and the binary representation of the private modulus are the same in at least key length (b) consecutive bits,
  a generator for generating local key material for a network device of the at least two first network devices, comprising
    a network device manager for obtaining in electronic form an identity number (A) for the network device and for electronically storing the generated local key material at the network device,
    a polynomial manipulation device for determining a univariate polynomial from the bivariate polynomial by substituting the identity number into the bivariate polynomial, reducing modulo the private modulus the result of the substitution.

An aspect of the invention concerns the system for configuring a network device.

A key derivation device may be implemented as a computer, e.g., an integrated circuit, running software, in hardware, in a combination of the two, and the like, configured for deriving the shared key from the result of the reduction modulo the key modulus.

Deriving the shared key from the result of the reduction modulo the key modulus, may include the application of a key derivation function, for example the function KDF, defined in the OMA DRM Specification of the Open Mobile Alliance (OMA-TS-DRM-DRM-V2_0_2-20080723-A, section 7.1.2 KDF) and similar functions. Deriving the shared key may include discarding one or more least significant bits (before applying the key derivation function). Deriving the shared key may include adding, subtracting, or concatenating an integer (before applying the key derivation function).

Multiple network devices each having an identity number and corresponding local key material may together form a communication network configured for secure, e.g., confidential and/or authenticated, communication between pairs of network devices.

The key generation is ID-based and allows the generation of pair wise keys between pairs of devices. A first device A may rely on an algorithm that derives a key from local key material and an identity number.

Reference is made to the paper "A Permutation-Based Multi-Polynomial Scheme for Pairwise Key Establishment in Sensor Networks" by authors Song Guo, Victor Leung, and Zhuzhong Qian.

An aspect of the invention concerns a method to determine a shared cryptographic key of key length (b) bits shared with a second network device from a polynomial and an identity number of the second network device.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

A network device is provided which is configured to determine a shared cryptographic key of key length (b) bits shared with a second network device from a polynomial and an identity number of the second network device. A reduction algorithm is used to evaluate the polynomial in the identity number of the second network device and reduce modulo a public modulus and modulo a key modulus. The reduction algorithm comprises an iteration over the terms of the polynomial. At least one of the iterations, associated with a particular term of the polynomial, comprises a first and second multiplication. The first multiplication is between the identity number and a least significant part of the coefficient of the particular term obtained from the representation of the polynomial, the least significant part of the coefficient being formed by the key length least significant bits of the coefficient of the particular term. The second multiplication is between the identity number and a further part of the coefficient of the particular term obtained from the representation of the polynomial, the further part of the coefficient being formed by bits of the coefficient of the particular term different from the key length least significant bits, the further part and the least significant part together forming strictly fewer bits than in the coefficient of the particular term of the polynomial.

BRIEF DESCRIPTION OF THE DRAWINGS

These and other aspects of the invention are apparent from and will be elucidated with reference to the embodiments described hereinafter. In the drawings, FIG. 2 is a schematic flow chart illustrating generating a shared key, FIG. 3 is a schematic sequence diagram illustrating generating a shared key, FIGS. 4a-4f represent various reduction algorithms.

Figure 1A:
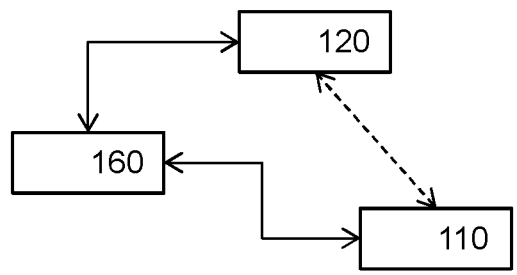
FIGS. 1a and 1b are schematic block diagrams illustrating a communication network.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1a is a schematic block diagram illustrating a communication network 100 during a set-up phase. FIG. 1a shows a network authority 160. FIG. 1a also shows multiple network devices; shown are first network device 110 and second network device 120.

Network devices have a registration phase and a use phase. In the registration phase a participating network device is provided with an identity number and local key material. The local key material is provided by network authority 160.

Network authority 160, may e.g. be implemented in the form of an electronic server, and may be directly connected with the device, e.g., during manufacture. Network authority 160 may provide the local key material later, say over the internet.

During the use phase, two (or more) network devices may establish a shared key by requesting the public identity numbers of the other network devices and combining it with their local key material.

The configuration application provides a full account how the network authority 160 may derive local key material. In an embodiment, the network authority performs a method comprising obtaining in electronic form a private modulus ($p_1$), a public modulus (N), and a bivariate polynomial ($f_1$) having integer coefficients, the binary representation of the public modulus and the binary representation of the private modulus are the same in at least key length (b) consecutive bits, generating local key material for the network device comprising obtaining in electronic form an identity number (A) for the network device, determining using a polynomial manipulation device a univariate polynomial from the bivariate polynomial by substituting the identity number into the bivariate polynomial, reducing modulo the private modulus the result of the substitution, and electronically storing the generated local key material at the network device.

In other words, the network authority may start from a bivariate polynomial and convert it to a univariate polynomial by substituting the identity number of a network device. By choosing the reductions, and coefficients etc in certain ways the security of this process may be improved. In the end; for a particular network device a particular univariate polynomial is obtained, which is stored therein.

In a further embodiment, generating local key material for the network device comprises generating an obfuscating number and adding using a polynomial manipulation device, the obfuscating number to a coefficient of the univariate polynomial to obtain an obfuscated univariate polynomial, the generated local key material comprising the obfuscated univariate polynomial.

To generate a shared key from the univariate polynomial, the network device may do the following: obtaining an external identity number of another network device, sending local identity number to other network device, substituting the external identity number into the obfuscated univariate polynomial modulo the public modulus, and reducing modulo key modulus. The public modulus and key modulus are selected together in or before the registration phase and is the same for all participating network devices. The key modulus depends on the size of the desired key and is typically 2 to the power of the key length. Starting from the reduction result modulo the key modulus, a shared key may be derived. Deriving a key may involve a key derivation step, to spread and/or concentrate entropy among the bits of the key, say an application of a cryptographic hash.

Unfortunately, due to the way the bivariate polynomial was chosen, it may happen that the shared key is not entirely the same. This may either be accepted; e.g. for ad-hoc networks it may not matter that some network devices are not capable of direct communication, similarly, for low-cost or low-security applications a certain failure rate may be acceptable. The chances of having equal keys may be increased by using a key equalizing procedure. Several reduction algorithms will be described which often or always give the same result. Indeed, given the fact that determining the shared key may fail in a small percentage of cases, it is particularly advantageous that algorithms may now be used which do not always give the exact same result but do so with high probability.

It is noted that the network authority may use a multi-variate polynomial, having more variables than 2 (bivariate), say 3 or 4 or even more. In this case multiple network nodes need to contribute its identity number for deriving a shared key. It is noted that the network authority may use a non-symmetric polynomial, in this case network device are divided among multiple groups, a shared key may only be derived if at least one member of each group is contributes his identity number.

For example, the network authority may generate a set of keying material for a device A of the form: $KM^A(X) = \Sigma_i KM_i^A x^i$ comprising coefficients $KM_i^A$ with $i=0, \ldots, \alpha$. A can generate a common key with another device B with identifier $\eta$ by doing the following: $K_{AB} \ll KM^A(X)|_{x=\eta} >_N >_{2^b} = \Sigma_i KM_i^A \eta^i >_N >_{2^b}$ where $N = 2^{(a+2)b} - 1$. This evaluation of the polynomial needs to be implemented efficiently on a small embedded processor. See in particular page 17-25 of the configuring application for examples on how to select parameters, root key material and local key material.

An efficient polynomial evaluation method is the so-called Horner's method, however it turns out that this method may still be optimized much further. The polynomial evaluation is performed with coefficients over large numbers of size greater than 128 bits. Therefore the evaluation of the common key $K_{AB}$ needs to be done without requiring too much memory for intermediate storage of big numbers. Additionally the polynomial is evaluated over modulo N and should be implemented without performing any costly divisions. The present invention provides optimizations for implementing the polynomial evaluation on an embedded micro-processor with minimal memory (flash and RAM) and still perform it fast.

A particular fine choice for N is close to $2^{(a+2)b}$. The size of N in terms of the degree of the polynomial and the key length, helps in protecting the system against attacks. Because N is close to a power of 2, modular operation may expressed as an addition, and possible a multiplication with the small offset (if it is not 1 or −1). Some optimization are independent of N, say moving the highest and lowest degree iterations out of the loop, words for each N.

Figure 1B:
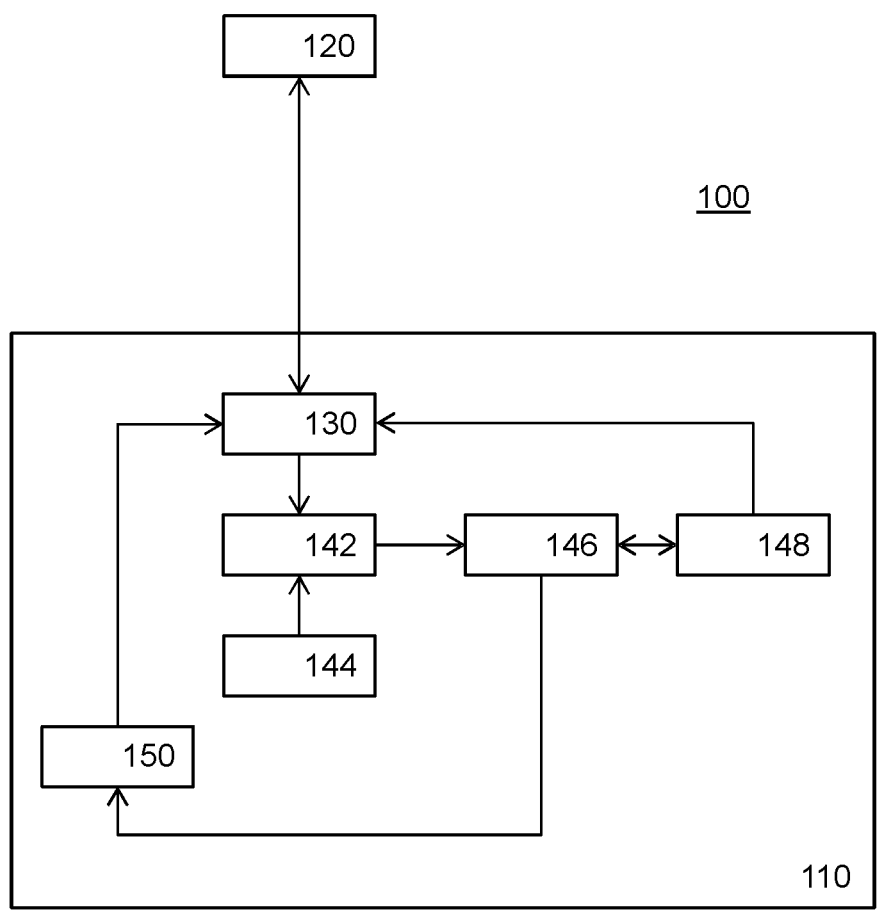

FIG. 1b is a schematic block diagram illustrating a communication network 100 comprising multiple network devices; shown are first network device 110 and second network device 120. We will illustrate first network device 110. Second network device 120 may be the same, or work along the same principles.

Network device 110 comprises a transceiver 130 combining a sender and a receiver for sending and receiving messages in electronic, e.g., digital, format, in wired or wireless from and to second network device 120. Possibly, transceiver 130 is also used to receive the local key material, say from network authority 160 or other trusted third party. Through the transceiver 130 the identity number of another network device is received; in the figure of the second network device 120.

The transceiver is a combination of a sender and a receiver, note that only the receiver is needed to derive the shared key locally. If it is needed that the shared key is derived at the first and second device more or less at the same time, then a sender may be conveniently used to send the identity number.

Network device 110 comprises a local key material storage 144. Local key material storage 144 may be implemented as local memory, e.g., non-volatile memory such as flash memory for storing the local key material. The local key material storage 144 may also be configured to obtain the local key material from e.g. the network authority 160, e.g., via transceiver 130. Local key material storage 144 is configured to provide the polynomial manipulation device with the needed parameters. The local key material stored by local key material storage 144 comprises a representation of the polynomial for later evaluation by the first network device. For example, a representation of the polynomial may be a list of the coefficient of the polynomial, for example, sorted by degree. However, the representation of the polynomial may be optimized in various ways; it turns out that some parts of the coefficients have very little impact on the end result. The determination of the shared key is optimized by leaving out those calculations which are unlikely to have a large impact on the final result. Not only the computation may be optimized in this way, also the storage of the representation may be optimized by not storing those parts of a coefficient which are not used.

Network device 110 comprises a polynomial manipulation device 142 configured to apply the polynomial to the external identity number according to a reduction algorithm to obtain a reduction result. The reduction algorithm is configured such that it gives a reduction result that corresponds to, i.e., approximates, the result that would have been obtained when: substituting the identity number of the second network device into the obfuscated univariate polynomial, and to perform two reductions on the result: First reducing the result of the substituting modulo the public modulus and second reducing modulo a key modulus. The reduction result corresponds in that it approximates the result of the other algorithm.

Often the reduction result will be equal to result of substituting the identity number of the second network device into the polynomial corresponding to the local key material, and performing two reductions on the result: modulo the public modulus and then modulo a key modulus. Unfortunately, sometimes the two may differ. If they do differ, the difference is often limited to one or a few least significant bits. It is preferred that two values differ in less than 1% of cases, less preferably in less than 10%.

It is noted that using obfuscated polynomials or polynomials derived from two private moduli, have the property that the reduction result obtained on different devices may also differ in rare cases (cf. the configuration application). For this reason it is not considered a large additional burden that in some rare additional cases further differences are introduced in the reduction result, since the system will already be equipped to deal with this fact, e.g., key equalization or other solutions.

Network device 110 comprises a key derivation device 146 for deriving the shared key from the result of the reduction modulo the key modulus. For example, key derivation device 146 may remove one or more least significant bits. Key derivation device 146 may also apply a key derivation function. It is also possible to use the result of the second reduction without further processing.

Network device 110 comprises an optional key equalizer 148. Note that it may happen that the shared key derived in the first network device is not equal to the key derived in the second network device (based on the identity number of the first network device). If this is considered undesirable, a key equalization protocol may be followed.

Network device 110 comprises a cryptographic element 150 configured to use the shared key for a cryptographic application. For example, cryptographic element 150 may encrypt or authenticate a message of the first network device with the shared key before sending it to the second network device, say a status message. For example, cryptographic element 150 may decrypt or verify the authenticity of a message received from the second network device.

Typically, the device 110 and 120 each comprise a microprocessor (not shown) which executes appropriate software stored at the device 110 and 120, e.g. the software may have been downloaded and stored in a corresponding memory, e.g. RAM or non-volatile memory such as Flash memory (neither shown).

FIG. 2 is a schematic flow chart illustrating a method of generating a shared key 200. The method comprises obtaining 210 an external identity number of another network device, sending 220 the local identity number to the other network device, executing 230 a reduction algorithm on the polynomial and the received identity number, deriving 250 a shared key, sending 260 a key confirmation message to the other network device, determining 270 if the key is confirmed, and a cryptographic application 280. If the key is not confirmed in step 270 then the method continues in step 250 with deriving a new key. For example, step 250 may remove one additional least significant bit each time the key is not confirmed.

For the reduction algorithm there are various choices, as explained using FIGS. 4a-4f The execution of a reduction algorithm may be done by a polynomial manipulation device. This may be done on a microprocessor with software according to the algorithm explained below.

Steps 250, 260, and 270 together form a key equalization protocol. For example, in step 260 a nonce and encryption of the nonce under the shared key derived in step 250 may be sent to the second device. In step 260 a message is received from the second device. The received message may simply say that the received key confirmation message showed that the keys are not equal. The received message may also contain a key confirmation message. In the latter case, the first network device verifies the key confirmation message and establishes if the keys are equal. If not a new key is derived, for example, by deleting a least significant bit.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 210 and 220 may be executed, at least partially, in parallel. Moreover, a given step may not have finished completely before a next step is started.

FIG. 3 shows in schematic form a possible sequence of message between two network devices, device A and B, while they are generating a shared key. Time runs downward. In step 310, network device A sends its identity number to device B. In step 320 device B, send its identity number and a key confirmation message for the shared key (K1) it derived based on identity number A and its local key material. In step 330, device A found that they did not generated the same key. Device A has deleted one least significant bit (say integer divide by 2) to obtain key K2. In step 330 device A sends a new key confirmation message. In this fashion A and B exchange key confirmation messages 340 until they arrive at the same key in step 350. In step 350 device A sends a key confirmation message to device B. Device B was able to verify that they had arrived at the same key. In step 360 it sends a confirmation thereof, this may be an authenticated message or a key confirmation message, etc. In step 370 device A sends a message M1 which is encrypted (say using AES) and/or authenticated (say using HMAC) using the now equal shared key.

The algorithm below gives a possible implementation of this approach, i.e., a protocol for mutual key agreement & session key derivation run by Device A and Device B

```
Set I=L
Set continue=TRUE
Set Length = b−I
Generate a b-bit key K
While(continue AND (Length>MINIMUM_LENGTH)){
    K = K>>I
    Perform Mutual authentication handshake with B based on K
    If handshake successful, then{
        continue=FALSE
    }}else{
        Length = b−I
    }
```

The protocol removes a number of bits of the bit string generated with a key sharing algorithm, such as described herein, and performs an authentication handshake, e.g., challenge-response. The authentication handshake may comprise a key confirmation message. If it is not successful, a few additional bits are removed, and so on until the handshake is successfully performed or the key got too short. The protocol can be modified in a number of ways, e.g., by removing a variable number of bits depending on the iteration or requiring always a fixed number of steps so that an eavesdropper observing the execution of the protocol does not gain any information about the length of the shared common key between A and B. This approach has the advantage that it makes sure that the shared keys are as long as possible; however, it has the potential disadvantage that it requires a number of exchanges for the agreement on the common key. On the other hand, for most applications this will not be a big problem because for most pairs of devices the keys will be equal or differ only in few bits and only a device pairs will arrive at keys with a relatively high number of different least significant bits. This follows from the properties of the keys generated.

There are other ways to arrive at a same key for both devices, e.g., as described in the configuring application.

Throughout FIGS. 4a-4f the following conventions are used: The network device executing the reducing result is the first network device, the network device contributing its identity number is the second network device; b denotes the key length, a denotes the degree of the polynomial (sometimes written in the text as a), $KM_{\eta,j}$ denotes the coefficient corresponding to the term of degree j of the polynomial corresponding to the first network device, $\eta$ is the identify number of the first network device, $\eta'$ the identity number of the second network device, N is the public modulus. The notation $(\ldots)_c$ denotes a modulo reduction of the number in brackets modulo c. The notation $>>c$ denotes a shift right over c bits, i.e., division by $2^c$, rounded downwards to the next integer.

The words input, output, for, end for, return are standard in the field of computer algorithms.

The advantageous public modulus $N=2^{(a+2)b}-1$ is used in the examples. This particular modulus allows a particular fast and elegant reduction. The algorithms may be adopted for different moduli, notably when the public modulus equals 2 to an exponent ($2^{(a+2)b}$) minus a (positive) offset, wherein the exponent is a multiple of the key length, and wherein the absolute value of the offset is less than 2 to the power of the key length. When the offset is not 1 but larger, say 3, the most significant part is added offset times to the least significant part instead once. If the offset is added instead of subtracted, the most significant part is added to least significant part.

As an example, one could take a=2 and b=128. For higher security, larger values may be used, say =4 or 6.

FIG. 4a illustrates in the form of so-called pseudo code how a reduction result may be obtained.

Line 3 and 5 show an iteration over the terms of the polynomial given by coefficients $KM_{\eta,j}$. In each iteration an intermediate value 'key' is multiplied with a new coefficient. This implementation of the evaluation of the key $<<\Sigma_i KM_i^A \eta^{'i}>_N>_{2^b}$ uses the so-called Homer's method.

The algorithm of FIG. 4b is similar to that of 4a but takes advantage of the particular form of the modulus used. The step temp $\leftarrow \langle key \times \eta + KM_j \rangle_N$ is optimized by using the fact the N is of the special form $N=2^{(a+2)b}-1$. Therefore if we denote $R=key \times \eta$ then R can be divided into two parts $R=R_1 \cdot 2^{(a+2)b}-R_0$ where $R_0$ is the $2^{(a+2)b}$ least significant bits (lsb) of R and $R_1$ are the remaining MSB of R. Given this, we can calculate $\langle R \rangle_N = \langle R_1 \cdot 2^{(a+2)b}-R_0 \rangle_N = R_1+R_0$ since $\langle 2^{(a+2)b} \rangle_N = 1$. To be exact: it is $\langle R_0+R_1 \rangle_N$ which equals $R_0+R_1$ if it is not too big, i.e., less than N. To be more exact, one could reduce modulo N once more, and doing so gives an approximation. However, $R_1$ is very small compared to N so the chance that introducing errors by not doing the second reduction is small. Instead, one could also do a modulo N reduction (with the same trick) after step 7 and only then apply step 8.

A similar optimization would be obtained if $N=2^{(a+2)b}-$offset. In which offset is small compared to N, say larger than 0 but smaller than the key modulus ($2^b$).

FIG. 4c avoids unnecessary computations. The performance of the reduction algorithm of FIGS. 4a and 4b can be improved by not performing intermediate computations which have no or rarely an effect in the final result. In FIG. 4c, advantage is taken of the fact that the first and last iterations require fewer computations. In this design, also mod N reductions are eliminated using the following expression $R_j = \text{key} \times \eta' + KM_j$ thus $\langle R_j \rangle_N = \langle R_{j,1} \times 2^{(a+2)b} + R_{j,0} \rangle_N \approx R_{j,1} + R_{j,0}$ whose implementation requires fewer computations than the previous one.

This optimization, uses the fact that $\eta \leq 2^b - 1$ and $KM_j \leq 2^{(a+2)b} - 1$. The operation key $\leftarrow \langle \text{key} \times \eta' + KM_j \rangle_N$ can be performed efficiently since $(\text{key} \times \eta' + KM) \leq 2^{(a+3)b} - 2^b < 2^{(a+3)b} - 1$.

Therefore key can be represented as $\text{key} = R_1 \cdot 2^{(a+2)b} + R_0$ where $R_1 \leq 2^b - 1$. Then reduction by N is simple addition as before but always with b bits.

The algorithms of FIGS. 4a, 4b and 4c do not have the feature that the identity number is used in first and second multiplication by a further and least significant part of a coefficient, which together form a smaller part than the full coefficient, i.e., some part of the polynomial is not used. Reduction algorithms 4a-4c are included for comparison with the algorithms 4d-4f FIG. 4d reduces data storage requirements. Not all the bits of the polynomial coefficients are required when generating the key. This algorithm needs to store only those bits which will be used. This approach also leads to a reduction in the number of computations required. The notation MSB$_c$ denotes the c most significant words. The notation LSB$_c$ denotes the c least significant words. Words are key length (b) bits wide.

FIG. 4d shows in lines 3 and 10 an iteration over the terms of the polynomial $KM_\eta$. In this particular embodiment, each iteration is associated with a particular term of the polynomial; the iterations are associated in order with degrees $\alpha - 1$ to 1. The iterations corresponding to degree $\alpha$ and 0 are performed outside the loop.

Line 5 shows a first multiplication between the identity number ($\eta'$) and a least significant part of the coefficient of the particular term obtained from the representation of the polynomial. The least significant part of the coefficient being formed by the key length least significant bits of the coefficient of the particular term, Line 4 shows a second multiplication between the identity number and a further part of the coefficient of the particular term obtained from the representation of the polynomial, the further part of the coefficient being formed by bits of the coefficient of the particular term different from the key length least significant bits.

Note that for most iterations the further part and the least significant part together form strictly fewer bits than in the coefficient of the particular term of the polynomial; in fact they have fewer words than the coefficient of the particular term of the polynomial. The coefficients that are not used need not be stored either.

Note that in each iteration the least significant part is exactly one word of key length bits. The number of bits in the further part is however decreasing in the loop, i.e., decreasing with the degree.

The number of words in the further part is the degree (j) plus an error control number (red). The error control number is here chosen to be 1. The error control number determines the likelihood that the result of the reduction algorithm is exactly the same as the result of the algorithm of FIG. 4a. To decrease the probability of getting unequal results between the first and second network device the error control number may be increased, say to 2. Larger values are possible, however the probability reduces exponentially with the error control number.

This algorithm makes further use of the fact that not all parts of the multiplied $KM_j \times \eta'$ contribute to the final result of the key. Some parts have very minimal effect (due to carries) but these errors can be corrected during the generation of a shared key as explained in FIGS. 2 and 3.

FIG. 4e as the algorithm of FIG. 4d also tries to reduce the data storage requirements. Although this design has to store some additional bits which the algorithm of FIG. 4d does not require, it is advantageous because fewer intermediate computations are required so implementation will be faster.

In Line 4 a further part is obtained, and in line 5 a second multiplication is shown. In line 6 a first multiplication is performed with a least significant part which has been introduced in key in the previous iteration. In line 5 a second multiplication is performed.

The optimization of FIG. 4d needed to track the amount of bits being used from $KM_j$ in each iteration and requires additional pointer management. The algorithm of FIG. 4e reduces the need for managing the memory. This optimization is more efficient in memory and in the number of clock cycles.

FIG. 4f illustrates a further reduction algorithm which requires a pre-computation step on the coefficients. It has both low data storage requirements, and is faster than the algorithm of FIG. 4e. A keying material share is generated as follows $$K'\eta(x) = \Sigma_{i=0}^{\alpha} \langle KM_i 2^{\alpha b} \rangle_N x^i = \Sigma_{i=0}^{\alpha} KM'_i x^i$$

thus each $KM'_i$ has a special form which makes this approach faster because the instructions to select the MSB and LSB can be skipped. Then, a network device $\eta$ wishing to generate a key with a second network device $\eta'$ may compute the key as:

$$K_{\eta,\eta'} = \left\langle \frac{KM'_i(\eta')}{2^{\alpha b}} \right\rangle_{2^b}$$

This transformation has the effect that the least significant part and the further part of a coefficient of a particular term $KM_i$ are represented in a single bit string adjacent to each other in $KM'_i$. Usually, the least significant part and the most significant part are separated from each other by a number of intermediate words, as the degree is lower this intermediate part is larger. Because of the transformation, the first and second multiplication may be performed in a single step.

The coefficients used in FIG. 4f have been transformed in this fashion. As a result, the multiplication in line 3 performs the first and second multiplication together. Note that the transformation preferably is done by the TTP and the network device stores these transformed coefficients in the local key material storage.

The table below gives an indication of the comparative advantages of the latter reduction algorithms. The algorithms were implemented in flash and used RAM for dynamic memory. Execution time is measured in CPU cycles. The configuration used to run the tests was: $\alpha = 6$, $b = 32$ and a 32-bit CPU (the ARM Cortex-M3). Algorithms of FIGS. 4a and 4b are comparatively worse than the examples given below.

| Reduction Algorithm | Flash Size | Ram Size | Execution time |
| --- | --- | --- | --- |
| FIG. 4c | 828 | 36 | 2521 |
| FIG. 4d | 892 | 36 | 2043 |
| FIG. 4e | 828 | 36 | 1742 |
| FIG. 4f | 716 | 36 | 1283 |

Figure 5:
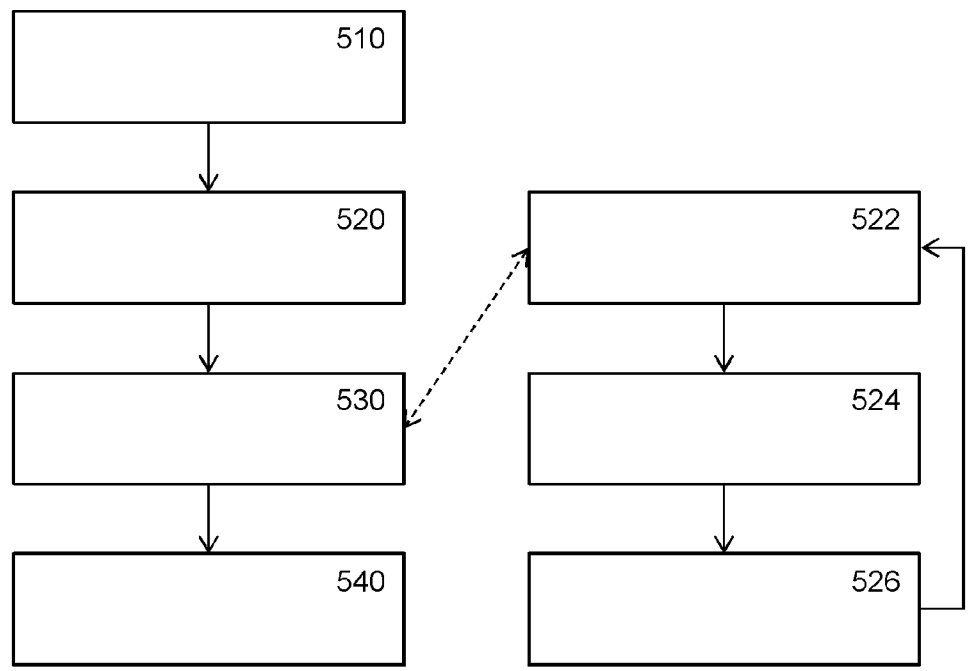
FIG. 5 is a further schematic flow chart illustrating generating a shared key.

FIG. 5 again illustrates in the form of a flow chart a method for determine a shared cryptographic key of key length (b) bits shared with a second network device from a polynomial and an identity number of the second network device, the polynomial having multiple terms, each term being associated with a different degree and a coefficient.

In step 510, local key material is stored in electronic form for the first network device, the local key material comprising a representation of a polynomial for later evaluation by the first network device. In step 520, an identity number of the second network device is obtained, the second network device being different from the first network device. In step 530, the polynomial is applied to the identity number according to a reduction algorithm to obtain a reduction result. In step 540, the shared key is deriving from the reduction result, say by a key derivation algorithm such as KDF. Additionally, a key equalizing algorithm may be performed. Step 530 includes a reduction algorithm; this is illustrated by a dashed arrow to steps 522, 524 and 526.

In step 522, an iteration over the terms of the polynomial is started, at least one iteration is associated with a particular term of the polynomial. In step 524, a first multiplication is performed between the identity number and a least significant part of the coefficient of the particular term obtained from the representation of the polynomial, the least significant part of the coefficient being formed by the key length least significant bits of the coefficient of the particular term.

In step 526, a second multiplication is performed between the identity number and a further part of the coefficient of the particular term obtained from the representation of the polynomial, the further part of the coefficient being formed by bits of the coefficient of the particular term different from the key length least significant bits, the further part and the least significant part together forming strictly fewer bits than in the coefficient of the particular term of the polynomial.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 524 and 526 may be executed, together by creating a number in which the further and least significant parts are adjacent. Moreover, a given step may not have finished completely before a next step is started.

A method according to the invention may be executed using software, which comprises instructions for causing a processor system to perform method 500. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS IN FIGS. 1a, 1b AND 2

100 a communication network
110 a first network device
120 a second network device
130 a transceiver
142 a polynomial manipulation device
144 a local key material storage
146 a key derivation device
148 a key equalizer
150 a cryptographic element
160 a network authority
210 obtaining external identity number of another network device
220 sending local identity number to other network device
230 executing reduction algorithm
250 deriving a shared key
260 sending a key confirmation message to the other network device
270 Key confirmed?
275 no
280 Cryptographic application

The invention claimed is:

1. A first network device configured to determine a shared cryptographic key of a key length shared with a second network device from a polynomial and an identity number of the second network device, the polynomial having multiple terms, each term of the multiple terms being associated with a different degree and a coefficient, the first network device comprising:
   an electronic storage for storing local key material for the first network device, the local key material comprising a representation of the polynomial for use in evaluation of the polynomial by the first network device, wherein the first network device has limited available computational resources,
   a receiver for obtaining the identity number of the second network device, the second network device being different from the first network device,
   a processor configured to apply the polynomial to the identity number according to a reduction algorithm, and for deriving the shared key from the reduction algorithm, wherein the reduction algorithm comprises performing multiple iterations, wherein each iteration of the multiple iterations is performed over the multiple terms of the polynomial of which at least one iteration, associated with a particular term of the polynomial, comprises:

a first multiplication between the identity number and a least significant part of a coefficient of the particular term obtained from the representation of the polynomial, the least significant part of the coefficient being formed by the key length of least significant bits of the coefficient of the particular term, and a second multiplication between the identity number and a further part of the coefficient of the particular term obtained from the representation of the polynomial, the further part of the coefficient being formed by bits of the coefficient of the particular term different from the key length least significant bits, the further part and the least significant part together forming strictly fewer bits than in the coefficient of the particular term of the polynomial, wherein the further part is a most significant part of the coefficient of the particular term, wherein a size of the further part increases with a degree of the particular term, such that the size of the further part increases where a influence of a reduction result increases, and the size of the further part decreases where the influence of the reduction result decreases, wherein as a result of the increasing and decreasing of the further part there is a reduction in computational resources utilized by the first network device.

2. The first network device as in claim 1, wherein a public modulus equals 2 to an exponent ($2^{(a+2)b}$) plus an offset, wherein the exponent is a multiple of the key length, and wherein the absolute value of the offset is less than 2 to the power of the key length, each coefficient of the polynomial being less than the public modulus.

3. The first network device as in claim 1, wherein a key modulus equals 2 to the power of the key length, the identity number being less than the key modulus.

4. The first network device as in claim 1, wherein each iteration of the iterations over the terms of the polynomial is associated with a specific term of the terms of the polynomial, each iteration comprising:

a first multiplication between the identity number and a least significant part of the coefficient of the specific term obtained from the representation of the polynomial, the least significant part of the coefficient being formed by the key length of the least significant bits of the coefficient of the specific term, and a second multiplication between the identity number and a further part of the coefficient of the specific term obtained from the representation of the polynomial, the further part of the coefficient being formed by bits of the coefficient of the specific term different from the key length least significant bits.

5. The first network device as in claim 4, wherein the further part of the coefficient of the specific term is a most significant part of the coefficient of the specific term, the most significant part of the coefficient being formed by a number of most significant bits of the coefficient of the specific term.

6. The first network device as in claim 4, wherein the number of bits in the further part is a multiple of the key length.

7. The first network device as in claim 4, wherein the number of bits in the further part decreases with decreasing degree of the specific term.

8. The first network device as in claim 7, wherein the number of bits in the further part is a multiple of the key length and wherein the multiple equals the degree of the specific term plus an error control number.

9. The first network device as in claim 8, wherein the error control number equals 1 or 2.

10. The first network device as in claim 1, wherein the coefficient of the polynomial is represented in pre-processed form, in the pre-processed form the least significant part and the further part of the coefficient of the particular term are represented in a single bit string adjacent to each other, the reduction algorithm comprising a single multiplication between the identity number and the single bit string for executing the first and second multiplication together.

11. A method for determining a shared cryptographic key of a key length shared between a first network device and a second network device from a polynomial and an identity number of the second network device, the polynomial having multiple terms, each term of the multiple terms being associated with a different degree and a coefficient, the method comprising:

storing local key material in electronic form for the first network device, the local key material comprising a representation of a polynomial for use in evaluation of the polynomial by the first network device, wherein the first network device has limited available computational resources, obtaining an identity number of the second network device, the second network device being different from the first network device, applying the polynomial to the identity number according to a reduction algorithm, and deriving the shared key from the reduction algorithm, wherein the reduction algorithm comprises an iteration over the terms of the polynomial of which at least one iteration, associated with a particular term of the polynomial, comprises:

a first multiplication between the identity number and a least significant part of a coefficient of the particular term obtained from the representation of the polynomial, the least significant part of the coefficient being formed by the key length of least significant bits of the coefficient of the particular term, and a second multiplication between the identity number and a further part of the coefficient of the particular term obtained from the representation of the polynomial, the further part of the coefficient being formed by bits of the coefficient of the particular term different from the key length least significant bits, the further part and the least significant part together forming strictly fewer bits than in the coefficient of the particular term of the polynomial, wherein the further part is a most significant part of the coefficient of the particular term, wherein a size of the further part increases with a degree of the particular term, such that the size of the further part increases where an influence of a reduction result increases, and the size of the further part decreases where the influence of the reduction result decreases, wherein as a result of the increasing and decreasing of the further part there is a reduction in computational resources utilized by the first network device.

12. A non-transitory computer-readable medium having one or more executable instructions stored thereon, which when executed by a processor, cause the processor to perform a method for determining a shared cryptographic key of a key length shared between a first network device and a second network device from a polynomial and an identity number of the second network device, the polynomial having multiple terms, each term of the multiple terms being associated with a different degree and a coefficient, the method comprising:

storing local key material in electronic form for the first network device, the local key material comprising a representation of a polynomial for use in evaluation of the polynomial by the first network device, wherein the first network device has limited available computational resources, obtaining an identity number of the second network device, the second network device being different from the first network device, applying the polynomial to the identity number according to a reduction algorithm, and deriving the shared key from the reduction algorithm, wherein the reduction algorithm comprises an iteration over the terms of the polynomial of which at least one iteration, associated with a particular term of the polynomial, comprises:

a first multiplication between the identity number and a least significant part of a coefficient of the particular term obtained from the representation of the polynomial, the least significant part of the coefficient being formed by the key length of least significant bits of the coefficient of the particular term, and a second multiplication between the identity number and a further part of the coefficient of the particular term obtained from the representation of the polynomial, the further part of the coefficient being formed by bits of the coefficient of the particular term different from the key length least significant bits, the further part and the least significant part together forming strictly fewer bits than in the coefficient of the particular term of the polynomial, wherein the further part is a most significant part of the coefficient of the particular term, wherein a size of the further part increases with a degree of the particular term, such that the size of the further part increases where an influence of a reduction result increases, and the size of the further part decreases where the influence of the reduction result decreases, wherein as a result of the increasing and decreasing of the further part there is a reduction in computational resources utilized by the first network device.

\* \* \* \* \*